United States Patent [19]
Prottey

[11] 3,860,054
[45] Jan. 14, 1975

[54] VALVE ASSEMBLIES
[75] Inventor: Frederick Vernon Prottey, Walsall, England
[73] Assignee: Dunlop Limited, London, England
[22] Filed: Nov. 20, 1972
[21] Appl. No.: 307,949

[30] Foreign Application Priority Data
Dec. 2, 1971   Great Britain................. 55884/71

[52] U.S. Cl................................. 152/415, 137/68
[51] Int. Cl............................................ B60b 29/00
[58] Field of Search........................... 152/415–438, 152/DIG. 5, 330 L

[56] References Cited
UNITED STATES PATENTS
2,320,042   5/1943   McMahan..................... 152/DIG. 5
3,476,073   11/1969   Jackson et al..................... 152/415

Primary Examiner—M. Henson Wood, Jr.
Assistant Examiner—Richard A. Bertsch
Attorney, Agent, or Firm—Stevens, Davis, Miller & Mosher

[57] ABSTRACT

A valve assembly for the inflation of and the release of lubricant into a pneumatic tire comprises a housing incorporating a control chamber, having inlet and outlet valves, which valves are both open or shut enabling inflation, through the chamber, of said chamber and an associated tire to substantially equal pressures. The assembly includes a pressure sensitive device arranged to respond to pressure differentials between the chamber and tire to release lubricant into the tire when a predetermined pressure differential exists.

12 Claims, 4 Drawing Figures

VALVE ASSEMBLIES

This invention relates to valve assemblies for pneumatic tires.

Upon partial or complete deflation of a pneumatic tire mounted on a wheel during the running of a vehicle opposite surfaces in the interior of the tire and wheel assembly come into contact with one another under more or less load according to whether or not the deflation is complete; the regions of the interior surfaces which normally come into contact are the interior surfaces of the tire close to but radially outward of the rim flange and the interior surfaces of the tire close to but radially inward of the tread edge.

When the surfaces come into contact considerable heat is generated within the rubber and textile components of the tire and very rapid structural failure ensues. It has been discovered that the major source of the heat generated is the relative movement of the surfaces in contact and under load and the temperature rise is particularly marked because of the high coefficient of friction of dry rubber-to-rubber contact.

It is an object of the present invention to provide a valve assembly which will control the inflation of an associated pneumatic tire and also control the release of lubricant into the interior of the tire in order to reduce the friction referred to above should the tire become partially or completely deflated during use.

According to one aspect of the present invention a valve assembly for the inflation of a pneumatic tire and the dispensing of lubricant for the interior surface of the tire comprises a housing incorporating a control chamber provided with inlet and outlet valves, the inlet and outlet valves being arranged to be either both closed to seal the control chamber or both open to allow the passage of air through the control chamber to the interior of an associated pneumatic tire thereby ensuring that the control chamber and interior of the tire are at substantially the same pressure when the desired tire pressure is reached and a pressure sensitive device arranged to respond to pressure differentials between the control chamber and the interior of the associated pneumatic tire and to release lubricant into the interior of the tire when the pressure in the control chamber exceeds that in the interior of the associated pneumatic tire by a predetermined amount.

The air in the control chamber may be separated from the lubricant by a flexible diaphragm, the diaphragm being capable of pressurizing the lubricant to a pressure equal to that of the air in the control chamber to subject the pressure sensitive device to said pressure. The flexible diaphragm may also be extensible. Alternatively, the lubricant may be in a chamber separated from the control chamber by a piston arrangement capable of pressurizing lubricant in the chamber to subject the pressure sensitive device to a pressure dependent on that in the control chamber.

A pressure sensitive means, in the form of a rupturable diaphragm or valve, subjected to the pressure in the interior of the tires and to the lubricant pressure may be arranged to release the lubricant into the interior of the tire when the lubricant pressure exceeds the tire pressure by a predetermined amount.

An embodiment of the present invention will now be described by way of example with reference to the accompanying drawings of which:

Figure 1:
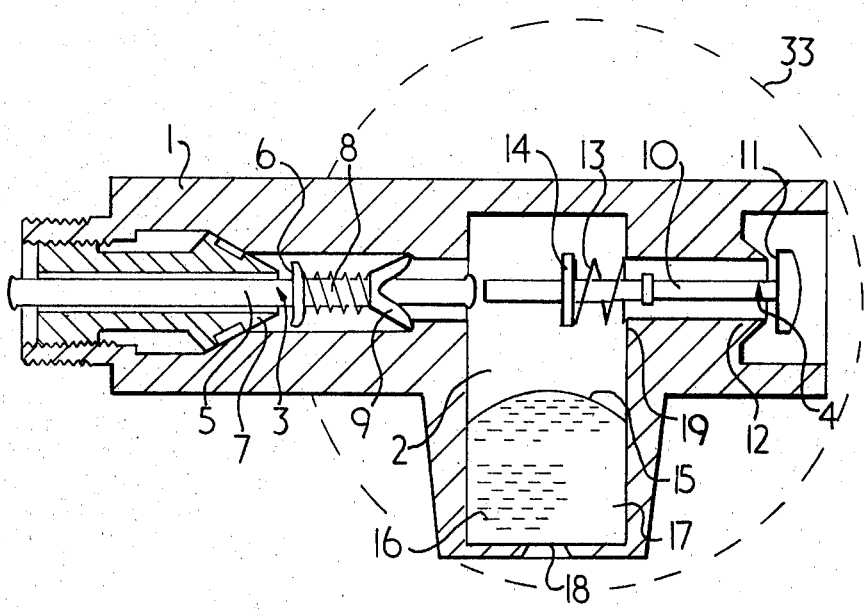
FIG. 1 shows a schematic sectional view of a valve assembly in accordance with the invention, which is not drawn to scale and should not therefore be taken as indicating the relative size of the components but merely as illustrating the principle of the present invention.

A valve assembly in accordance with the present invention as shown in the accompanying FIG. 1 comprises a housing 1 incorporating a control chamber 2 provided with an inlet valve 3 and an outlet valve 4.

Inlet valve 3 comprises an inlet valve stem 5 provided with an annular sealing surface 6 which is spring-loaded into contact with an inlet valve seat 7 by a compression spring 8 acting between the rear of the sealing surface 6 and an abutment 9 on the valve assembly housing.

Outlet valve 4 comprises an outlet valve stem 10 provided with an annular sealing surface 11 which is spring-loaded into contact with an outlet valve seat 12 by a compression spring 13 acting between an abutment 14 on the outlet valve stem and an abutment 19 on the valve assembly housing.

Inlet and outlet valves 3 and 4 are axially aligned so that the opening of inlet valve 3 by depressing valve stem 5 causes valve stem 5 to contact and depress outlet valve stem 10 thus also opening outlet valve 4. Thus inlet and outlet valves 3 and 4 are arranged to be either both open, to allow the passage of air through control chamber 2 to an associated pneumatic tire 33, or both closed to seal the control chamber 2 from atmospheric pressure and from the pressure in the associated tire 33.

One end of control chamber 2 is defined by flexible diaphragm 15 which separates the air in control chamber 2 from a quantity of lubricant 16, for the interior surface of the associated tire, housed in a further chamber 17 in the valve assembly housing. The arrangement of diaphragm 15 causes lubricant 16 to be pressurised to a level equal to that of the air in control chamber 2, which in turn is equal to that in the associated tire.

Chamber 16 is separated from the interior of the associated tire by a pressure sensitive means in the form of a rupturable diaphragm 18 which is arranged to rupture, thereby releasing the lubricant into the interior of the associated tire, when the pressure level of the lubricant in chamber 16, and hence the air in control chamber 2, exceeds the level of pressure present in the interior of the associated tire by an amount at least sufficient to take into account slight variations in pressure which may, for example, be caused by temperature fluctuations.

After the rupture of diaphragm 18 the lubricant may be dispensed into the interior of the associated tire mainly by centrifugal force, although initially by a combination of centrifugal force and air pressure. Alternatively, if an extensible diaphragm is used air pressure alone could cause the lubricant to be dispensed. However, in this latter event the volume ratio of the control chamber and the lubricant containing chamber must be chosen to be such that an adequate pressure differential between the control chamber and interior of the tire will exist throughout the dispensing of the lubricant. Clearly, if it is desired to rely on air pressure alone to dispense the lubricant a larger control chamber volume will be required.

The valve assembly is arranged to be secured to an associated wheel so that the outlet valve and pressure sensitive means are both disposed in the interior of the associated tire. This can conveniently be accomplished in a well-base wheel by arranging the outlet valve and pressure sensitive means to project into the well of the wheel.

The valve assembly described above and illustrated in the accompanying FIG. 1 functions as follows.

The associated tire is inflated by connecting an airline, foot pump or other suitable inflation device to inlet valve 3, the inflation device being arranged to depress inlet valve stem 5 thereby opening inlet valve 3 and outlet valve 4 as previously described.

With both the inlet and outlet valves open air flows in through the inlet valve 3, through control chamber 2 and out through outlet valve 4 into the interior of the associated tire. Thus the air pressure levels in control chamber 2 and the interior of the associated tire are substantially equal. The air pressure in control chamber 2 pressurizes the lubricant in chamber 17 by displacing diaphragm 15 until the lubricant pressure and the air pressure in control chamber 2 are substantially equal.

When the tire pressure reaches the desired value the inflation device is disconnected thus closing inlet valve 3 and outlet valve 4 to seal control chamber 2 so that the level of pressure in control chamber 2 and lubricant containing chamber 17 is also substantially equal to the desired value and thus rupturable diaphragm 18 is subjected to substantially equal pressures on its two faces.

Should the associated tire lose inflation pressure during use the pressure exerted on the rupturable diaphragm 18 by the lubricant will exceed that the exerted on the diaphragm by the tire pressure. Rupturable diaphragm 18 is arranged to rupture thereby releasing the lubricant in chamber 17 into the interior of the associated tire when the lubricant pressure exceeds the tire pressure by a predetermined level of say 15 pounds per square inch (p.s.i.).

If it is desired to deflate the associated tire manually, the opening of both inlet and outlet valves simultaneously prevents the differential pressure across rupturable disphragm 18 becoming excessive and resulting in the release of the lubricant.

It is of course essential for outlet valve 4 to be capable of remaining closed when the pressure in control chamber 2 exceeds that in the associated tire at least until the predetermined pressure differential has been exceeded and the lubricant released.

Figure 2:
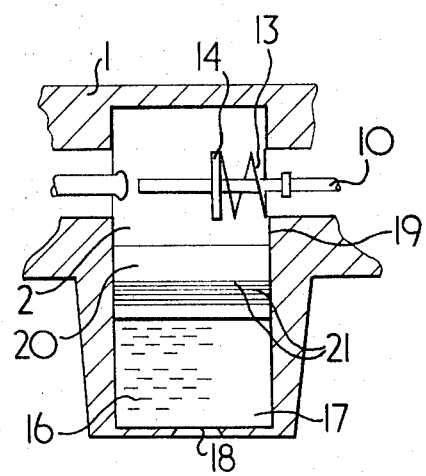
FIG. 2 shows a schematic sectional and partial view of a first modification of the valve assembly shown in FIG. 1.

In the modification shown in FIG. 2 the flexible diaphragm 15 is replaced by a piston 20. The piston 20 has sealing rings 21 arranged around it to ensure that no lubricant 16 enters the control chamber 2. The remainder of the valve assembly is substantially similar to that described in connection with FIG. 1.

The chamber 17 has, in the embodiment shown, substantially the same diameter as the control chamber 2, thus causing the lubricant pressure to be substantially the same as that of the air pressure in control chamber 2. In this modification, the volume ratio of the control chamber and the lubricant chamber must be chosen to be such that an adequate pressure differential between the control chamber and the interior of the tire will exist throughout the dispensing of the lubricant if it is desired to use air pressure to dispense the lubricant.

Figure 4:
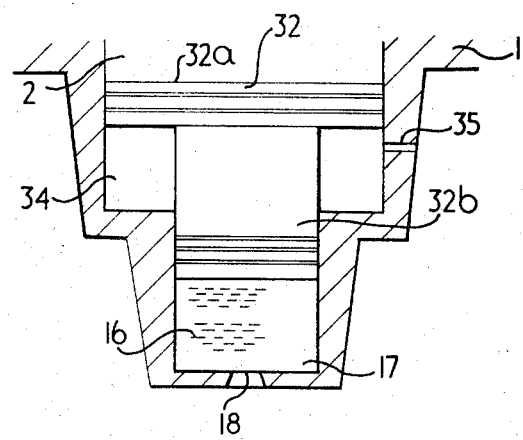
FIG. 4 shows a variation of the modification shown in FIG. 2.

In a variation (see FIG. 4) of the modification shown in Fg. 2, the piston arrangement 32 may have different diameter ends 32a and 32b, the chambers 2 and 17 being of complementary shape to said piston 32. This arrangement may be useful when it is desired to dispense the lubricant by air pressure and to ensure fast dispensing thereof the pressure is preferably high.

The annular space 34 is vented either to the atmosphere or to the interior of the tire by vent hole 35.

In the case where the space 34 is vented to the atmosphere, if the surface area of the end 32b of the piston is half that of the end 32a, the chambers 2 and 17 are of equal volume ie the volume ratio is 1, and a tire inflation pressure of 30 p.s.i. is used, then the lubricant will be subjected to an initial pressure of 60 p.s.i. which will fall to approximately 30 p.s.i. near the end of dispensing due to the change in volume of the control chamber 2. In this situation the disphragm 18 may, for example, be made to rupture at a pressure differential of 45 p.s.i.

However, in the preferred case when the space 34 is vented to the interior of the tire if the above inflation pressures etc are considered, the pressure of the fluid would be 30 p.s.i. since the air pressure in space 34 would cancel out half the pressure acting on the end 32a. Thus the diaphragm 18 would not come under pressure until the tire deflated and, for example, the diaphragm could be arranged to rupture at 20 p.s.i. i.e. a loss of inflation pressure of 10 p.s.i.. Obviously as deflation increases the pressure acting on the lubricant will increase to double the pressure in control chamber 2.

Figure 3:
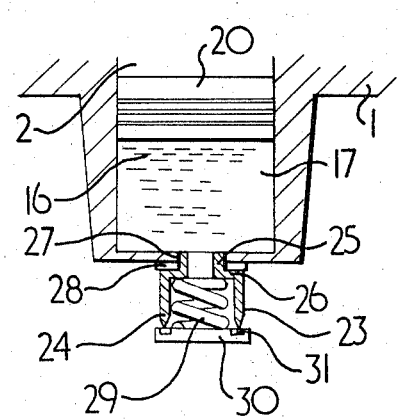
FIG. 3 shows a schematic sectional and partial view of a second modification fo the valve assembly shown in FIG. 1.

Although the modification in FIG. 3 shows a piston 20, this modification may be used with the disphragm 15 shown in FIG. 1. This modification comprises replacing the rupturable diaphragm 18 with a valve 22 which may be of any suitable type.

The particular valve shown has a cylindrical body 23 comprising two portions, a portion 24 and a portion 25 of smaller diameter than the portion 24, an annular step 26 being formed between the junctions. The portion 25 is provided with a screw-thread on its radially outer surface, the screw-thread fitting a complementary screw-thread 27 in the chamber 17, a sealing ring 28 being provided between the step 26 and the housing 1.

The portion 24 houses a tension spring 29 being securely attached at one end to the step 26 and at the other end to a valve closure member 30 which has an annular sealing ring 31 of soft material, e.g. rubber, to seat against the end of portion 24.

The spring 29 is chosen to be strong enough to hold the valve shut until a predetermined pressure differential, e.g. 10 p.s.i., exists, at which time the closure member 30 is forced away from he body 23 to allow the lubricant to escape into the interior of the tire.

Although in the constructions described above in connection with FIGS. 1 to 3 the valve assembly is arranged to pressurize the lubricant to a level equal to the pressure in the control chamber, the lubricant pressure need not necessarily be equal to the control chamber pressure (as described in connection with FIG. 4) but may merely be a predetermined function of the control chamber pressure.

It may not be possible or desirable to make the lubricant containing chamber an equal diameter extension of the control chamber as shown in the accompanying FIGS. 1 to 3. It will be appreciated that the lubricant containing chamber can be of any desired capacity or dimension and need not necessarily be disposed within the interior of the associated tire.

Similarly, the pressure sensitive device which controls the release of the lubricant need not necessarily be itself disposed within the tire provided it is arranged to be subjected to the tire and lubricant pressures.

The valve assembly described above is an efficient, compact and inexpensive unit which enables a single valve assembly to control the inflation of an associated pneumatic tire and also the release of lubricant into the interior of the tire.

Having now described my invention, what I claim is:

1. A valve assembly for the inflation of a pneumatic tire and the dispensing of lubricant for the interior surface of the tire comprising a housing, a control chamber incorporated in said housing, said chamber having inlet and outlet valves, the inlet and outlet valves being arranged to be either both closed to seal the control chamber or both open to allow the passage of air through the control chamber to the interior of an associated pneumatic tire thereby ensuring that the control chamber and the interior of the tire are at substantially the same pressure when the desired tire pressure is reached, and a pressure sensitive device arranged to respond to pressure differentials between the control chamber and the interior of the associated pneumatic tire and to release lubricant into the interior of the tire when the pressure in the control chamber exceeds that in the interior of the associated pneumatic tire by a predetermined amount.

2. A valve assembly according to claim 1 wherein the pressure sensitive device comprises a rupturable diaphragm.

3. A valve assembly according to claim 1 wherein the pressure sensitive device comprises a valve.

4. A valve assembly for the inflation of a pneumatic tire and the dispensing of lubricant for the interior surface of the tire comprising a housing, a control chamber incorporated in said housing, said chamber having inlet and outlet valves, the inlet and outlet valves being arranged to be either both closed to seal the control chamber or both open to allow the passage of air through the control chamber to the interior of an associated pneumatic tire thereby ensuring that the control chamber and the interior of the tire are at substantially the same pressure when the desired tire pressure is reached, a pressure sensitive device arranged to respond to pressure differentials between the control chamber and the interior of the associated pneumatic tire and to release lubricant into the interior of the tire when the pressure in the control chamber exceeds that in the interior of the associated pneumatic tire by a predetermined amount and a flexible diahragm separating the air in the control chamber from the lubricant, the diaphragm being capable of pressurizing the lubricant to a pressure equal to that of the air in the control chamber to subject the pressure sensitive device to said pressure.

5. The valve assembly of claim 4 in which the pressure sensitive device is a rupturable diaphragm.

6. The valve assembly of claim 4 in which the pressure sensitive device comprises a valve.

7. A valve assembly according to claim 4 wherein the flexible diaphragm is an extensible diaphragm.

8. A valve assembly for the inflation of a pneumatic tire and the dispensing of lubricant for the interior surface of the tire comprising a housing, a control chamber incorporated in said housing, said chamber having inlet and outlet valves, the inlet and outlet valves being arranged to be either both closed to seal the control chamber or both open to allow the passage of air through the control chamber to the interior of an associated pneumatic tire thereby ensuring that the control chamber and the interior of the tire are at substantially the same pressure when the desired tire pressure is reached, a lubricant chamber separated from the control chamber by a piston, said piston being positioned to pressurize lubricant in the lubricant chamber to a pressure which is a function of the pressure of the air in the control chamber, a pressure sensitive device in communication with the lubricant chamber, arranged to respond to pressure differentials between the control chamber and the interior of the associated pneumatic tire and to release lubricant into the interior of the tire when the pressure in the control chamber exceeds that in the interior of the associated pneumatic tire by a predetermined amount.

9. The valve assembly of claim 8 in which the pressure sensitive device is a rupturable diaphragm.

10. The valve assembly of claim 8 in which the pressure sensitive device comprises a valve.

11. A valve assembly according to claim 8 wherein the piston arrangement comprises a piston having substantially the same diameter over the whole of its length whereby the lubricant is pressurised to substantially the pressure of the air in the control chamber.

12. A valve assembly according to claim 8 wherein the piston arrangement comprises a piston having two portions, one portion being of a diameter smaller than the other portion.

* * * * *